United States Patent [19]
Burns et al.

[11] Patent Number: 5,485,224
[45] Date of Patent: Jan. 16, 1996

[54] MOTION COMPENSATED VIDEO SIGNAL PROCESSING BY INTERPOLATION OF CORRELATION SURFACES AND APPARATUS FOR DOING THE SAME

[75] Inventors: James E. Burns, Basingstoke; Morgan W. A. David, Farnham; Martin R. Dorricott, Basingstoke, all of United Kingdom

[73] Assignee: Sony United Kingdom Limited, Staines

[21] Appl. No.: 191,924

[22] Filed: Feb. 4, 1994

[30] Foreign Application Priority Data

Apr. 8, 1993 [GB] United Kingdom .................. 9307410

[51] Int. Cl.⁶ .............................. H04N 7/34; H04N 7/46; H04N 7/28
[52] U.S. Cl. ........................ 348/699; 348/415; 348/412; 348/409; 348/405; 348/700; 348/416
[58] Field of Search ................................. 348/699, 409, 348/413, 419, 414, 700, 412, 405, 416

[56] References Cited

U.S. PATENT DOCUMENTS

| | | | |
|---|---|---|---|
| 4,937,666 | 6/1990 | Yang | 348/419 |
| 5,005,078 | 4/1991 | Gillard | 348/419 |
| 5,008,744 | 4/1991 | Fernando et al. | 348/699 |
| 5,021,881 | 6/1991 | Avis et al. | 348/419 |
| 5,027,203 | 6/1991 | Samad et al. | 348/416 |
| 5,157,732 | 10/1992 | Ishii et al. | 348/699 |
| 5,162,907 | 11/1992 | Keating et al. | 348/413 |
| 5,347,312 | 9/1994 | Saunders et al. | 348/699 |

FOREIGN PATENT DOCUMENTS

| | | |
|---|---|---|
| 0187641 | 7/1986 | European Pat. Off. . |
| 0348207 | 12/1989 | European Pat. Off. . |
| 2231748 | 11/1990 | United Kingdom . |
| WO92/21201 | 11/1992 | WIPO . |

OTHER PUBLICATIONS

Conference: Signal Processing of HDTV, II; Proc Third Workshop on HDTV, pp. 131–137; M. Ziegler. Also INSPEC abstract B91011288 See whole article.

*Primary Examiner*—Tommy P. Chin
*Attorney, Agent, or Firm*—William S. Frommer; Alvin Sinderbrand

[57] ABSTRACT

Motion compensated video signal processing apparatus, in which motion vectors are generated to represent image motion between a pair of input images of an input video signal, comprises means for comparing search blocks within one of the pair of input images with respective search areas, comprising a plurality of blocks, in the other of the pair of input images, to generate a first plurality of original correlation surfaces, each comprising an array of correlation values representing correlation between the respective search block and search area; means for generating a second plurality of interpolated correlation surfaces by interpolation from the original correlation surfaces; and means for generating a respective motion vector from each interpolated correlation surface, in dependence on a point of maximum correlation in that interpolated correlation surface.

18 Claims, 9 Drawing Sheets

Original vector v

Interpolated

CS(x,y)

w(x,y)

w(x,y)+B $CS(x,y) \cdot (w(x,y)+B)$ $CS(x,y)+w(x,y)$ $CS(x,y) \cdot w(x,y)$

MOTION COMPENSATED VIDEO SIGNAL PROCESSING BY INTERPOLATION OF CORRELATION SURFACES AND APPARATUS FOR DOING THE SAME

BACKGROUND OF THE INVENTION

1. Field of the Invention

This invention relates to motion compensated video signal processing.

2. Description of the Prior Art

Motion compensated video signal processing is used in applications such as television standards conversion, film standards conversion and conversion between video and film standards.

In a motion compensated television standards converter, such as the converted described in the British Published Patent Application number GB-A-2 231 749, pairs of successive input images are processed to generate sets of motion vectors representing image motion between the pair of input images. The processing is carried out on discrete blocks of the images, so that each motion vector represents the inter-image motion of the contents of a respective block.

Each set of motion vectors is then supplied to a motion vector producer which derives a subset of the set of motion vectors for each block. The subset is then passed to a motion vector selector which assigns one of the subset of motion vectors to each picture element (pixel) in each block of the image. The selected motion vector for each pixel is supplied to a motion compensated interpolator which interpolates output images from the input images, taking into account the motion between the input images.

Motion compensated video signal processing such as that described above requires powerful and complex processing apparatus to carry out the very large number of calculations required to generate and process motion vectors for each pair of input images. This is particularly true if the images are in a high definition format, of if the processing is to be performed on an input video signal to produce an output video signal in real time, in which case multiple sets of identical apparatus may be operated in parallel in order to generate sets of motion vectors for each output image in the time available (e.g. an output field period).

SUMMARY OF THE INVENTION

It is an object of the invention to provide an improved motion compensated video signal processing apparatus and method.

This invention provides a motion compensated video signal processing apparatus in which motion vectors are generated to represent image motion between a pair of input images of an input video signal, said apparatus comprising:

means for comparing search blocks within one of said pair of input images with respective search areas, comprising a plurality of blocks, in the other of said pair of input images, to generate a first plurality of original correlation surfaces, each comprising an array of correlation values representing correlation between said respective search block and search area;

means for generating a second plurality of interpolated correlation surfaces by interpolation from said original correlation surfaces; and means for generating a respective motion vector from each interpolated correlation surface, in dependence on a point of maximum correlation in said interpolated correlation surface.

As mentioned above, motion compensated video signal processing places great demands on the processing capacity of a video signal processing apparatus. The invention recognises that the block matching process used to generate correlation surfaces is particularly demanding, and that these demands can be relaxed by generating motion vectors from correlation surfaces interpolated from a plurality of original (block-matched) correlation surfaces. This can obviate or reduce the need for parallel processing to generate the motion vectors in real time, leading to a reduction in the complexity (and the corresponding cost and size) of the apparatus.

Although the original correlation surfaces may comprise correlation values which increase in value with increasing correlation, in a preferred embodiment each original correlation surface comprises an array of correlation values representing the difference between the content of the respective search block and search area.

It is preferred that the correlation values represent the difference between the luminance content of the search block and the search area.

Preferably the means for generating a motion vector comprises means for detecting a correlation value indicative of minimum difference between the search block and the search area.

Preferably the second plurality is greater than the first plurality. In this way, a particularly advantageous reduction in the data processing requirements of the apparatus can be achieved by generating the correlation surfaces used for motion vector estimation by interpolation from a smaller number of correlation surfaces generated by block matching.

In a preferred embodiment the first plurality of original correlation surfaces comprises a rectangular array of original correlation surfaces, the position of each original correlation surface within the rectangular array depending on the position of a corresponding search block within the respective input image; and the second plurality of interpolated correlation surfaces comprises a rectangular array of interpolated correlation surfaces.

In order to improve the discrimination of multiple points of local correlation maxima in the case when each interpolated correlation surface comprises an array of correlation values, it is preferred that the apparatus comprises: means for multiplying the correlation values in each interpolated correlation surface by a weighting value dependent on the position of that correlation value within the array, thereby generating a weighted interpolated correlation surface comprising an array of weighted correlation values; and means for generating a motion vector from the weighted interpolated correlation surface, in dependence on a weighted correlation value indicative of a point of maximum correlation in the weighted correlation surface.

During the motion vector estimation process, a confidence test is performed on each point of maximum correlation, to determine whether that point represents a significant correlation maximum over the remainder of the correlation surface. It has been previously proposed that the correlation surface should be "weighted", by the addition of a variable weighting function, in order to add importance to correlation maxima near to a point indicative zero image motion, and to aid the generation of a valid motion vector (i.e. one which passed the confidence test), even when the (unweighted) correlation surface comprises multiple distinct local minima (correlation maxima).

Viewed from a second aspect this invention provides a motion compensated video signal processing apparatus in which motion vectors are generated to represent image motion between a pair of input images of an input video signal, said apparatus comprising:

- means for comparing a search block within one of said pair of input images with a respective search area, comprising a plurality of blocks, in the other of said pair of input images, to generate a correlation surface comprising an array of correlation values representing correlation between said search block and said search area;
- means for multiplying each correlation value by a weighting value dependent on said position of said correlation value within said array, thereby generating a weighted correlation surface comprising an array of weighted correlation values; and
- means for generating a motion vector from said weighted correlation surface, in dependence on a weighted correlation value indicative of a point of maximum correlation in said weighted correlation surface.

In its second aspect, the invention recognises that the use of an additive weighting function has different results depending on the average level of the correlation surface. In order to resolve these differences, the invention provides a multiplicative weighting function, for which the weighting effect varies in proportion to the average level of the correlation surface.

In order to avoid the generation of false minima in the correlation surface, it is preferred that all of the weighting values are non-zero.

Preferably the weighting values increase monotonically with increasing distance from a predetermined point within the array of correlation values.

In a preferred embodiment the predetermined point is a point indicative of zero image motion.

Although various increasing functions could be used, such as a linear function of distance from the predetermined point, it is preferred that the weighting values increase in proportion to the square root of distance from the predetermined point.

In a preferred embodiment the apparatus comprises means for performing a predetermined confidence test on each motion vector to determine whether the detected point of maximum correlation in the weighted correlation surface represents a significant correlation maximum in the weighted correlation surface.

It is preferred that apparatus according to the invention comprises a motion compensated interpolator for interpolating an output image of an output video signal according to the motion vectors generated from the pair of input images.

Motion compensated video signal processing apparatus according to the invention is particularly usefully employed in a motion compensated television standards converter.

Viewed from a third aspect this invention provides a method of motion compensated video signal processing in which motion vectors are generated to represent image motion between a pair of input images of an input video signal, said method comprising the steps of:

- comparing search blocks within one of said pair of input images with respective search areas, comprising a plurality of blocks, in the other of said pair of input images, to generate a first plurality of original correlation surfaces, each comprising an array of correlation values representing correlation between said respective search block and said respective search area;
- generating a second plurality of interpolated correlation surfaces by interpolation from said original correlation surfaces; and
- generating a respective motion vector from each interpolated correlation surface, in dependence on a point of maximum correlation in said interpolated correlation surface.

Viewed from a fourth aspect this invention provides a method of motion compensated video signal processing in which motion vectors are generated to represent image motion between a pair of input images of an input video signal, said method comprising the steps of:

- comparing a search block within one of said pair of input images with a respective search area, comprising a plurality of blocks, in the other of said pair of input images, to generate a correlation surface comprising an array of correlation values representing correlation between said search block and said search area;
- multiplying each correlation value by a weighting value dependent on a position of said correlation value within said array, thereby generating a weighted correlation surface comprising an array of weighted correlation values; and
- generating a motion vector from said weighted correlation surface, in dependence on a weighted correlation value indicative of a point of maximum correlation in said weighted correlation surface.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENT

Figure 1:
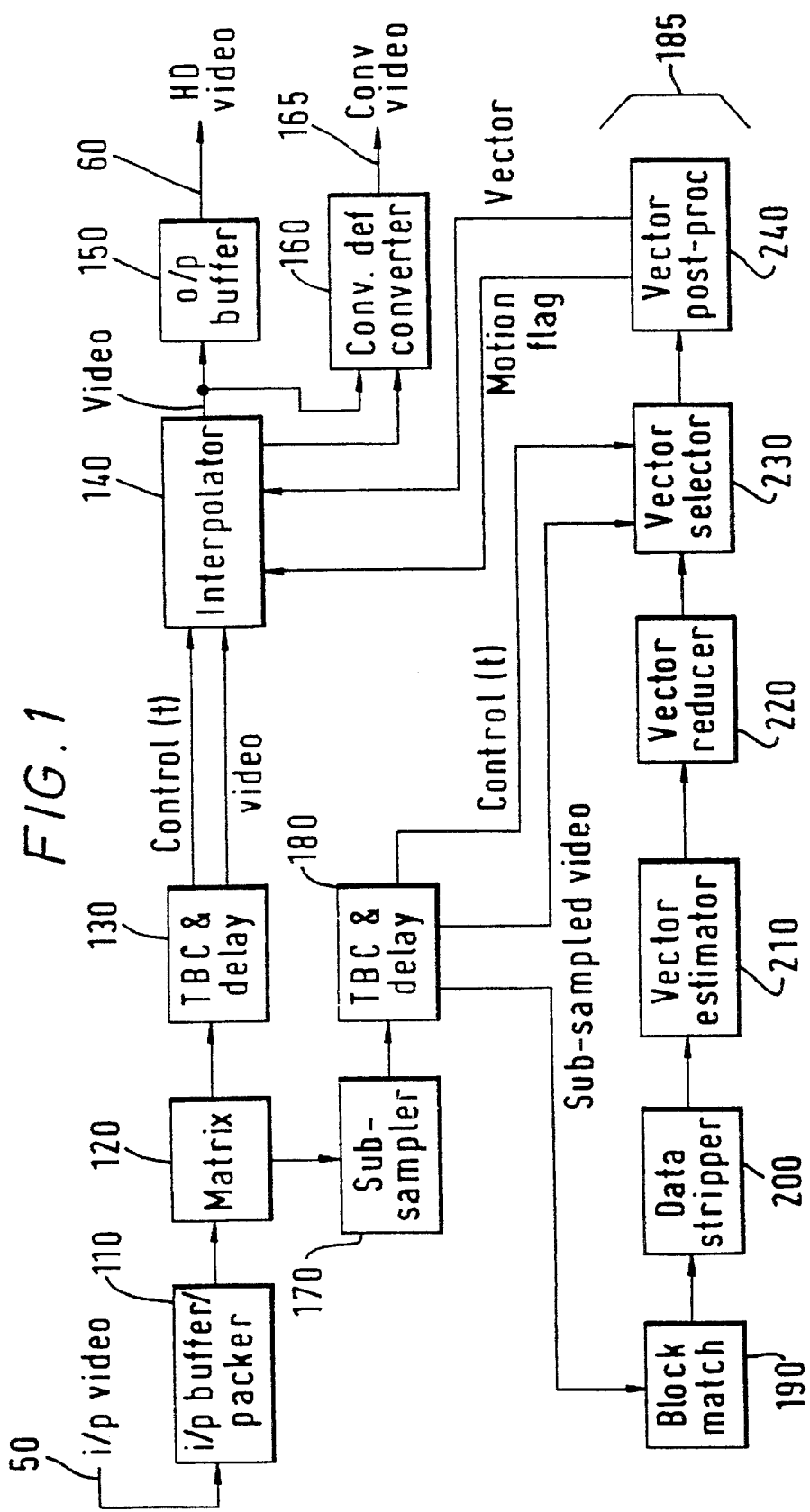
FIG. 1 is a schematic block diagram of a motion compensated television standards conversion apparatus.

FIG. 1 is a schematic block diagram of a motion compensated television standards conversion apparatus. The apparatus receives an input interlaced digital video signal 50 (e.g. an 1125/60 2:1 high definition video signal (HDVS)) and generates an output interlaced digital video signal 60 (e.g a 1250/50 2:1HDVS).

The input video signal 50 is first supplied to an input buffer/packer 110. In the case of a conventional definition input signal, the input buffer/packer 110 formats the image data into a high definition (16:9 aspect ratio) format, padding with black pixels where necessary. For a HDVS input the input buffer/packer 110 merely provides buffering of the data.

The data are passed from the input buffer/packer 110 to a matrix circuit 120 in which (if necessary) the input video signal's format is converted to the standard "CCIR recommendation 601" (Y,Cr,Cb) format.

From the matrix circuit 120 the input video signal is passed to a time base changer and delay 130, and via a sub-sampler 170 to a subsampled time base changer and delay 180. The time base changer and delay 130 determines the temporal position of each field of the output video signal, and selects the two fields of the input video signal which are temporally closest to that output field for use in interpolating that output field. For each field of the output video signal, the two input fields selected by the time base changer are appropriately delayed before being supplied to an interpolator 140 in which that output field is interpolated. A control signal t, indicating the temporal position of each output field with respect to the two selected input fields, is supplied from the time base changer and delay 130 to the interpolator 140.

The subsampled time base changer and delay 180 operates in a similar manner, but using spatially subsampled video supplied by the subsampler 170. Pairs of input fields are selected by the subsampled time base changer and delay 180 from the subsampled video, to be used in the generation of motion vectors.

The time base changers 130 and 180 can operate according to synchronisation signals associated with the input video signal, the output video signal, or both. In the case in which only one synchronisation signal is supplied, the timing of fields of the other of the two video signals is generated deterministically within the time base changers 130, 180.

The pairs of fields of the subsampled input video signal selected by the subsampled time base changer and delay 180 are supplied to a motion processor 185 comprising a direct block matcher 190, a data stripper 200, a motion vector estimator 210, a motion vector reducer 220, a motion vector selector 230 and a motion vector post-processor 240. The pairs of input fields are supplied first to the direct block matched 190 which calculates correlation surfaces representing the spatial correlation between search blocks in the temporally earlier of the two selected input fields and (larger) search areas in the temporally later of the two input fields.

From the correlation surfaces output by the block matcher 190, the data stripper 200 generates a larger number of interpolated correlation surfaces, which are then passed to the motion vector estimator 210. The motion vector estimator 210 detects points of greatest correlation in the interpolated correlation surfaces. (The original correlation surfaces actually represent the difference between blocks of the two input fields; this means that the points of maximum correlation are in fact minima on the correlation surfaces, and are referred to as "minima"). In order to detect a minimum, additional points on the correlation surfaces are interpolated, providing a degree of compensation for the loss of resolution caused by the use of subsampled video to generate the surfaces. From the detected minimum on each correlation surface, the motion vector estimator 210 generates a motion vector which is supplied to the motion vector reducer 220.

The motion vector estimator 210 also performs a confidence test on each generated motion vector to establish whether that motion vector is significant above the general noise level, and associates a confidence flag with each motion vector indicative of the result of the confidence test. The confidence test, known as the "threshold" test, is described (along with other features of the apparatus of FIG. 1) in GB-A-2 231 749. The confidence test is also discussed in more detail below.

A test is also performed by the motion vector estimator 210 to detect whether each vector is aliased. In this test, the correlation surface (apart from an exclusion zone around the detected minimum) is examined to detect the next lowest minimum. If this second minimum does not lie at the edge of the exclusion zone, the motion vector derived from the original minimum is flagged as being potentially aliased.

The motion vector reducer 220 operates to reduce the choice of possible motion vectors for each pixel of the output field, before the motion vectors are supplied to the motion vector selector 230. The output field is notionally divided into blocks of pixels, each block having a corresponding position in the output field to that of a search block in the earlier of the selected input fields. The motion vector reducer compiles a group of four motion vectors to be associated with each block of the output field, with each pixel in that block eventually being interpolated using a selected one of that group of four motion vectors.

Vectors which have been flagged as "aliased" are re-qualified during vector reduction if they are identical to non-flagged vectors in adjacent blocks.

As part of its function, the motion vector reducer 220 counts the frequencies of occurrence of "good" motion vectors (i.e. motion vectors which pass the confidence test and the alias test, or which were re-qualified as non-aliased), with no account taken of the position of the blocks of the input fields used to obtain those motion vectors. The good motion vectors are then ranked in order of decreasing frequency. The most common of the good motion vectors which are significantly different to one another are then classed as "global" motion vectors. Three motion vectors which pass the confidence test are then selected for each block of output pixels and are supplied, with the zero motion vector, to the motion vector selector 230 for further processing. These three selected motion vectors are selected in a predetermined order of preference from:

(i) the motion vector generated from the corresponding search block;

(ii) those generated from surrounding search blocks ("local" motion vectors); and (iii) the global motion vectors.

The motion vector selector 230 also receives as inputs the two input fields which were selected by the subsampled time base changer and delay 180 and which were used to calculate the motion vectors. These fields are suitably delayed so that they are supplied to the motion vector selector 230 at the same time as the vectors derived from those fields. The motion vector selector 230 supplies an output comprising one motion vector per pixel of the output field. This motion vector is selected from the four motion vectors for that block supplied by the motion vector reducer 220.

The vector selection process involves detecting the degree of correlation between test blocks of the two input fields pointed to by a motion vector under test. The motion vector having the greatest degree of correlation between the test blocks is selected for use in interpolation of the output pixel. A "motion flag" is also generated by the vector selector. This flag is set to "static" (no motion) if the degree of correlation between blocks pointed to by the zero motion vector is greater than a preset threshold.

The vector post-processor reformats the motion vectors selected by the motion vector selector 230 to reflect any vertical scaling of the picture, and supplies the reformatted vectors to the interpolator 140. Using the motion vectors, the interpolator 140 interpolates an output field from the corresponding two (non-subsampled) interlaced input fields selected by the time base changer and delay 130, taking into account any image motion indicated by the motion vectors currently supplied to the interpolator 140.

If the motion flag indicates that the current output pixel lies in a moving part of the image, pixels from the two selected fields supplied to the interpolator are combined in relative proportions depending on the temporal position of the output field with respect to the two input fields (as indicated by the control signal t), so that a larger proportion of the nearer input field is used. If the motion flag is set to "static" then temporal weighting is not used. The output of the interpolator 140 is passed to an output buffer 150 for output as a HDVS output signal, and to a down-converter 160 which generates a conventional definition output signal 165, using the motion flag.

The subsampler 170 performs horizontal and vertical spatial subsampling of the input fields received from the matrix 120. Horizontal subsampling is a straightforward operation in that the input fields are first pre-filtered by a half-bandwidth low pass filter (in the present case of 2:1 horizontal decimation) and alternate video samples along each video line are then discarded, thereby reducing by one half the number of samples along each video line.

Vertical subsampling of the input fields is complicated by the fact that the input video signal is interlaced. This means that successive lines of video samples in each interlaced field are effectively separated by two video lines of the complete frame, and that the lines in each field are vertically displaced from those in the preceding or following field by one video line of the complete frame. The method of vertical subsampling actually used involves a first stage of low pass filtering in the vertical direction (to avoid aliasing), followed by a filtering operation which effectively displaces each pixel vertically by half a video line downwards (for even fields) or upwards (for odd fields). The resulting displaced fields are broadly equivalent to progressively scanned frames which have been subsampled vertically by a factor of two.

Figure 2:
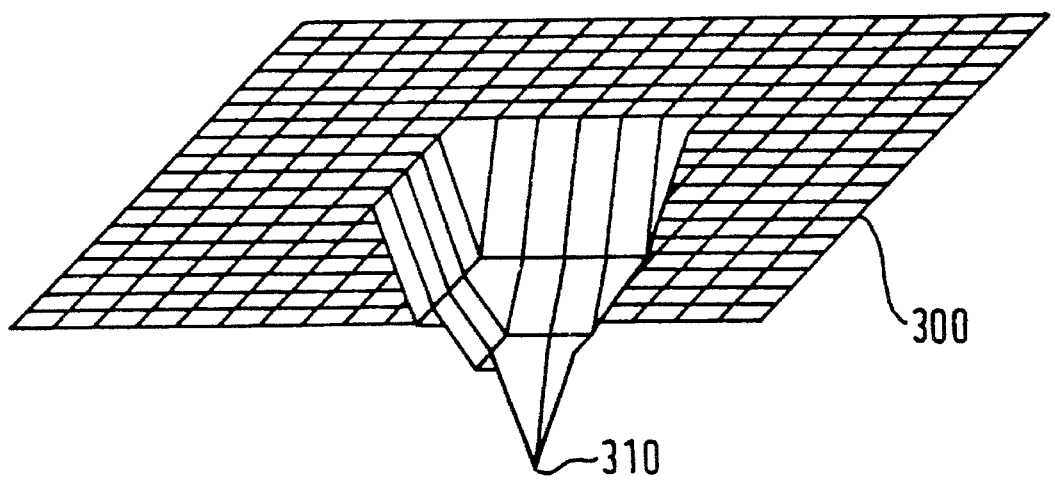
FIG. 2 is a schematic diagram of a correlation surface.

FIG. 2 is a schematic diagram of a correlation surface 300. The correlation surface represents the difference between a search block of the earlier of the two input fields from which the surface is generated, and a (larger) search area in the later of the two input fields. A peak in correlation is therefore represented by a minimum point 310 on the correlation surface 300. The position of the minimum point 310 on the correlation surface 300 determines the magnitude and direction of the motion vector derived from that correlation surface.

In the apparatus of FIG. 1, each motion vector is generated by detecting a minimum point on a respective correlation surface. In total, for each pair of input fields supplied to the motion processor 185, eight thousand correlation surfaces are supplied to the vector estimator 210 for use in the generation of eight thousand motion vectors.

In order to reduce the processing requirements of the apparatus of FIG. 1, only one quarter of the total number of correlation surfaces are generated by the comparison of blocks of the two sub-sampled input fields supplied to the block marcher 190. The correlation surfaces to be used in motion vector generation are then interpolated from the correlation surfaces generated by block matching. This means that two thousand "original" correlation surfaces are generated by the block matched 190 and supplied to the data stripper 200; the data stripper 200 then generates eight thousand "interpolated" correlation surfaces from the two thousand original correlation surfaces, for use in motion vector estimation.

Figure 3A:
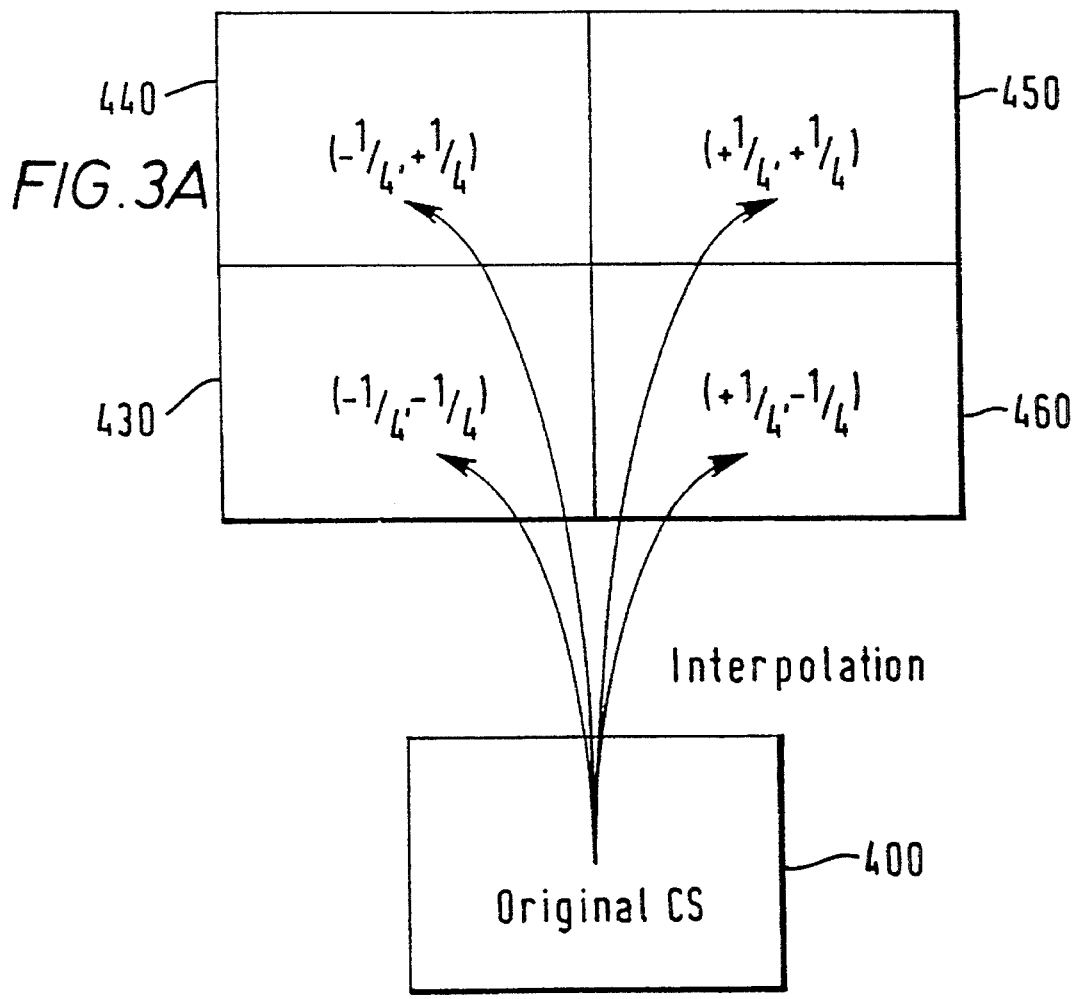
FIGS. 3a, 3b and 3c schematically illustrate the interpolation of correlation surfaces.
Figure 3B:
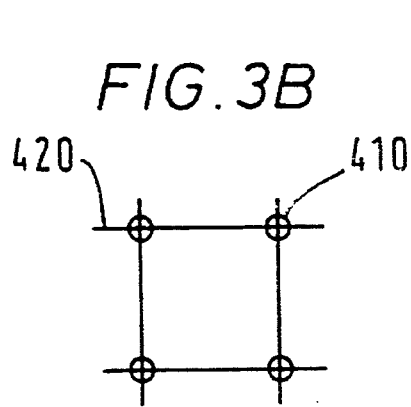
Figure 3C:
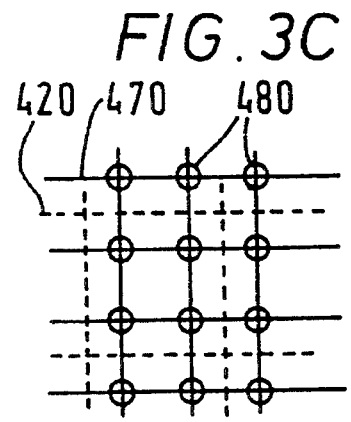

FIGS. 3a, 3b and 3c schematically illustrate the interpolation of correlation surfaces performed by the data stripper 200.

Referring to FIG. 3a, each original correlation surface 400 is generated (by the block marcher 190) by comparing a search block at a particular position within the earlier of a pair of input fields with a (larger) search area in the other of the pair of input fields. As shown in FIG. 3b, the search blocks are centred around respective positions (e.g. the position 410) in a grid pattern 420 imposed on the respective input field. The original correlation surfaces generated from the search blocks have corresponding relative positions 40 on the grid 420.

As described above, in order to increase the number of correlation surfaces from the two thousand generated by block matching to the eight thousand required by the motion vector estimator 20, an interpolation process is performed in the data stripper 200 by which four interpolated correlation surfaces 430, 440, 450 and 460 are generated from each original correlation surface 400. (In fact a filtering process is used so that each interpolated correlation surface depends on a number of surrounding original correlation surfaces).

The interpolated correlation surfaces 430, 440, 450 and 460 have effective positions which are centred around that of the original correlation surface 400, but are displaced slightly horizontally and vertically from the position of the original correlation surface 400. The displacements are indicated in FIG. 3a as fractions of the horizontal and vertical spacing of the original correlation surface grid (i.e. the search block grid 420). In particular, the displacements of the four interpolated correlation surfaces (CS) 430, 440, 450 and 460 generated from the original correlation surface 400 are as follows:

*Interpolated CS* 430: (−¼ *horizontally;* −¼ *vertically*)

*Interpolated CS* 440: (−¼ *horizontally;* +¼ *vertically*)

*Interpolated CS* 450: (+¼ *horizontally;* +¼ *vertically*)

*Interpolated CS* 460: (+¼ *horizontally;* −¼ *vertically*)

The effect of interpolating correlation surfaces using the above displacements is illustrated in FIG. 3c, which shows a grid 470 of the effective positions 480 of the interpolated correlation surfaces. For comparison, the grid 420 illustrating the positions of original correlation surfaces is also shown (in broken line) in FIG. 3c.

The use of interpolated correlation surfaces to generate motion vectors will now be illustrated with reference to FIGS. 4, 5a and 5b. In particular, FIG. 4 is a schematic diagram of a part 500 of an image in which a vertical bar 510 rotates in a clockwise direction, and FIGS. 5a and 5b respectively illustrate the original and interpolated correlation surfaces generated from the image to represent the motion of the bar 510.

Figure 4:
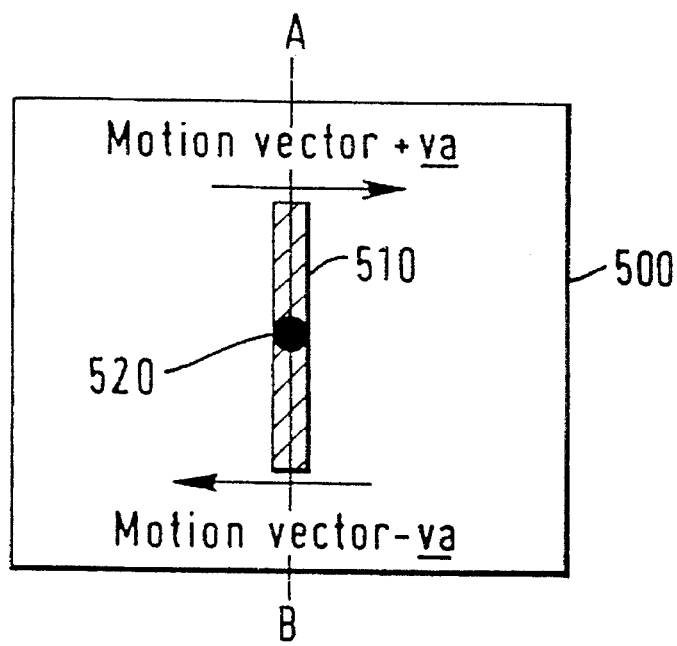
FIG. 4 is a schematic diagram of a part of an image in which a vertical bar rotates in a clockwise direction.

In FIG. 4, the horizontal component of the motion of the top of the bar 510 is +va, and that of the bottom of the bar 510 is −va. There is a continuous variation of the horizontal component along the length of the bar, passing through zero at the centre 520 of rotation of the bar 510.

Figure 5A:
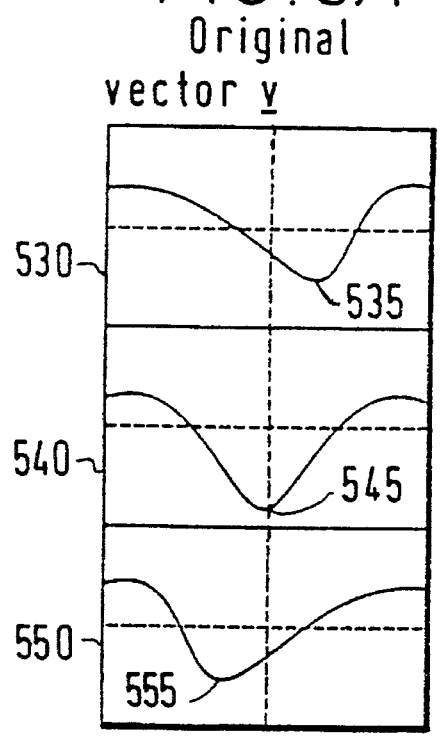
FIGS. 5a and 5b respectively illustrate original and interpolated correlation surfaces generated from the image of FIG. 4.
Figure 5B:
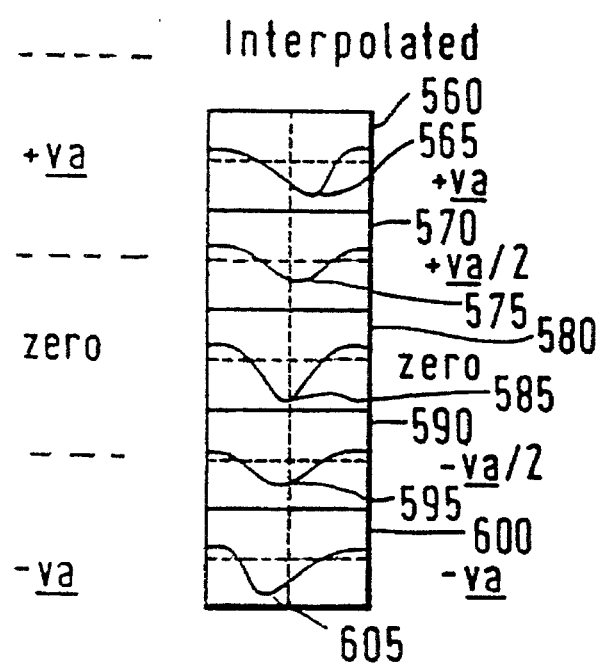

As shown in FIG. 5a, three original correlation surfaces 530, 540 and 550 are generated from the portion 500 of the image; a respective cross section through each of these original correlation surfaces is illustrated. In the correlation surface 530, a minimum 535 represents the motion of the top of the bar 510, and corresponds to a horizontal component of the motion of +va. In the correlation surface 540 the minimum is at a point indicative of zero motion, and therefore represents the motion of the centre 520 of the bar 510. Finally, in the correlation surface 550, the minimum 555 is at a point indicative of a horizontal component of −va, and therefore represents the motion of the bottom of the bar.

As described above, the original correlation surfaces 530, 540 and 550 are not used by the vector estimator 210 in the generation of motion vectors. Instead, interpolated correlation surfaces, at one half of the horizontal and vertical spacing of the original correlation surfaces, are generated for use in interpolation of motion vectors. Cross sections through five such interpolated correlation surfaces 560, 570, 580, 590 and 600 are illustrated in FIG. 5b. The five interpolated correlation surfaces 560, 570, 580, 590 and 600, have respective minima 565, 575, 585, 595 and 605, which indicate respective horizontal motion components of:

minimum 565: +va (horizontal motion of the top of the bar 510);

minimum 575: +va/2 (horizontal motion of a point between the top and centre 520 of the bar 510)

minimum 585: 0 (horizontal motion of the centre 520 of the bar 510)

minimum 595: −va/2 (horizontal motion of a point between the centre 520 and the bottom of the bar 510)

minimum 605: −va (horizontal motion of the bottom of the bar 510)

The five interpolated correlation surfaces 560, 570, 580, 590 and thus represent the motion of the rotating bar 510 at twice the vertical spatial resolution of the original correlation surfaces 530, 540, 550.

Figure 6A:
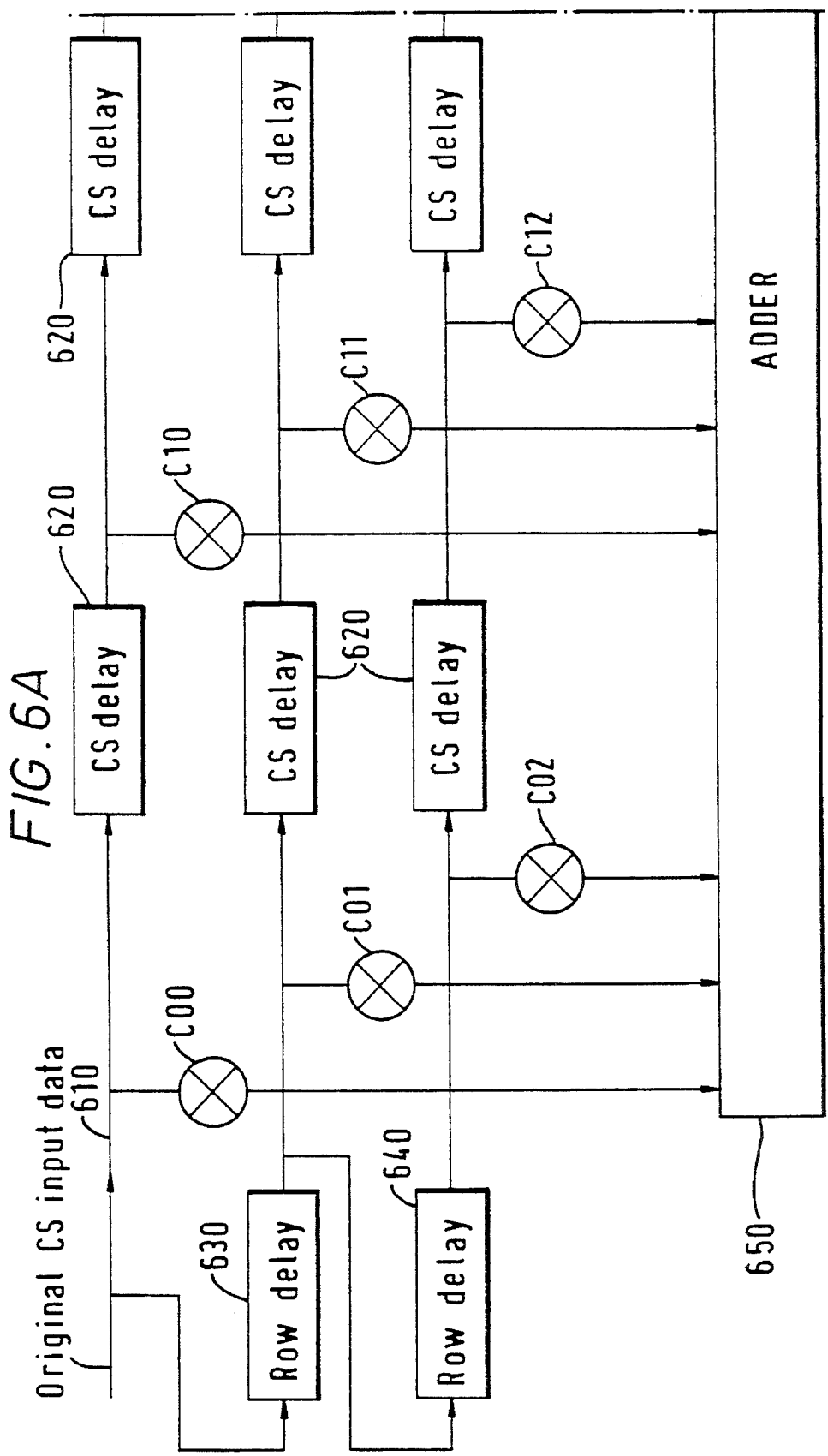
FIG. 6A and 6B constitute a block diagram of part of a data stripper.
Figure 6B:
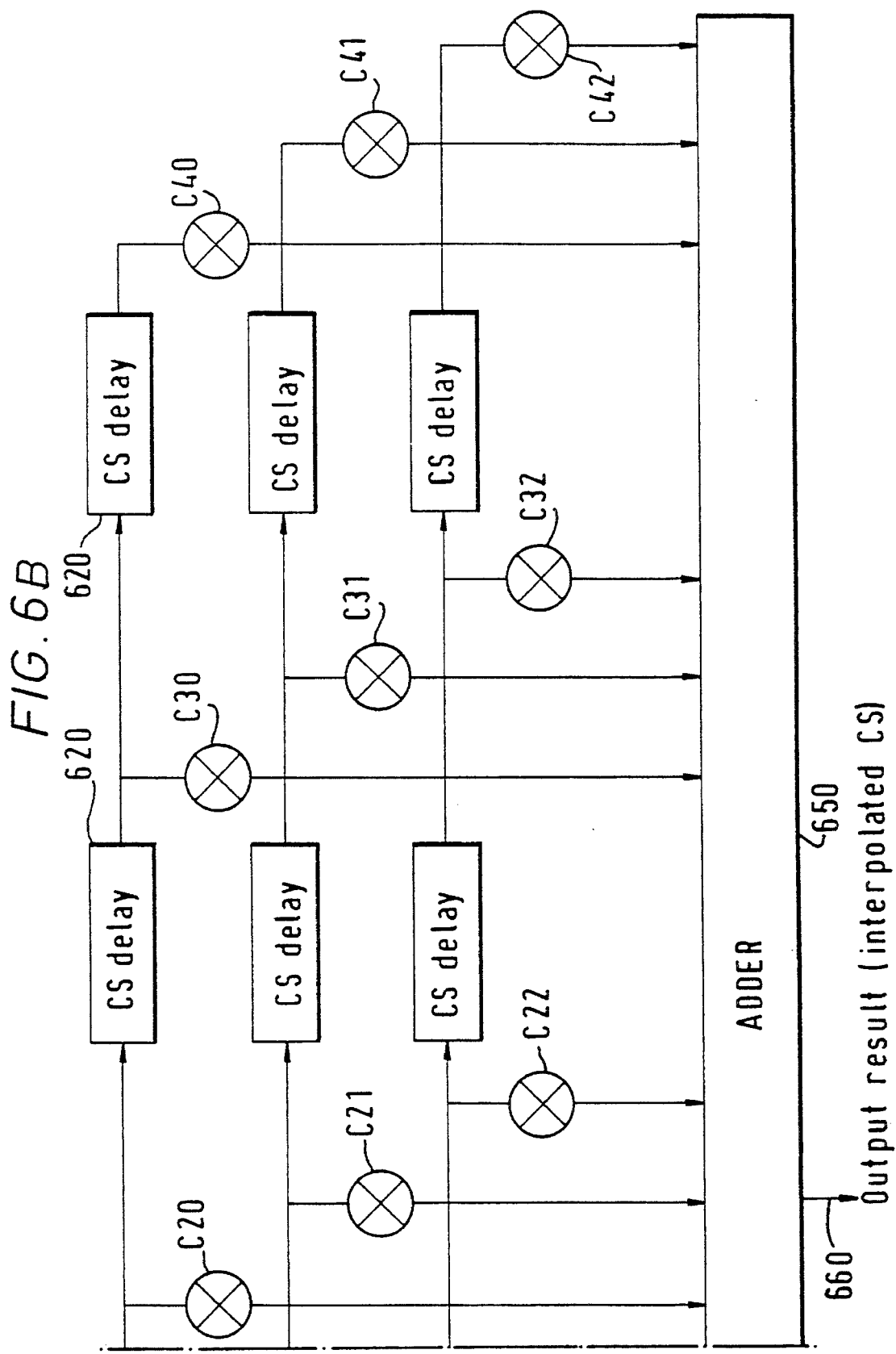

FIG. 6 is a schematic block diagram of a part of the data stripper 200 in which the correlation surfaces are interpolated.

In the apparatus of FIG. 6, input data 610 representing the original correlation surfaces are supplied in serial form from the block matcher 190 to a number of correlation surface delays 620. Each correlation surface delay 620 delays the input data 610 by a period equivalent to the transmission time of the data representing one correlation surface. This means that the data at the input and the output of each of the correlation surface delays 620 represent identical points within two adjacent correlation surfaces.

The input data 610 are also supplied to two row delays 630, 640, which delay the data by a period equivalent to the transmission time of a complete row of correlation surfaces (i.e. the correlation surfaces generated from a complete row of search blocks). This means that the data at the input and the output of a row delay (630 or 640) represent identical points within two correlation surfaces at corresponding positions in two adjacent rows. The output of each of the row delays 630, 640 is supplied to a series of four correlation surface delays 620.

The input data 610, the data at the output of each of the correlation surface delays 620, and the data of the output of each of the row delays 630, 640 are multiplied by respective filter coefficients CO0, C01 ..., C42, before being summed by an adder 650. The summed output 660 of the adder 650 represents successive points within an interpolated correlation surface. By using the filtering arrangement shown in FIG. 6, each interpolated correlation surface is derived by a filtered combination of data representing corresponding positions in fifteen surrounding original correlation surfaces.

By using the apparatus shown in FIG. 6 to generate the required eight thousand correlation surfaces, significantly less data processing hardware is required than would be the case if the eight thousand correlation surfaces were generated directly by block matching.

When the correlation surfaces interpolated by the apparatus of FIG. 6 are passed to the motion vector estimator 210, they are examined to detect the point of minimum difference (the point of maximum correlation) in each surface, from which a respective motion vector is generated. A second lowest minimum is also detected from the correlation surface, apart from an exclusion region around the actual minimum point. A confidence test is then performed to detect the significance of the original minimum with respect to the remainder of the correlation surface. A basic form of the confidence test would involve detecting whether the difference between the first and second minima is greater than a predetermined threshold value.

Figure 7:
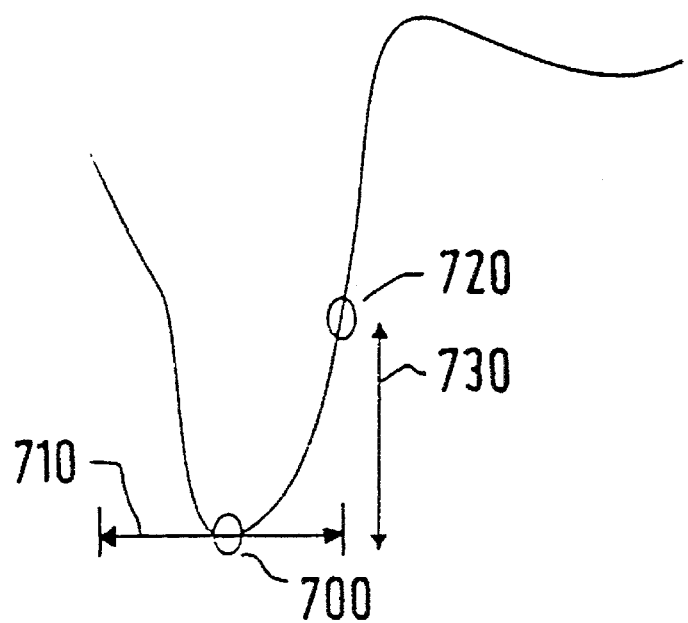
FIG. 7 illustrates a correlation surface having a single minimum which passes a basic confidence test.

A minimum which passes the basic confidence test described above is illustrated schematically in FIG. 7. In particular, a first minimum 700 is surrounded by an exclusion region 710, and the next lowest point outside the exclusion region (i.e. a point 720) is detected as the second minimum. The first minimum 700 is considered valid, and is used in the generation of a valid motion vector, because the difference 730 in correlation between the first and second minima is greater than a predetermined threshold value.

Figure 8:
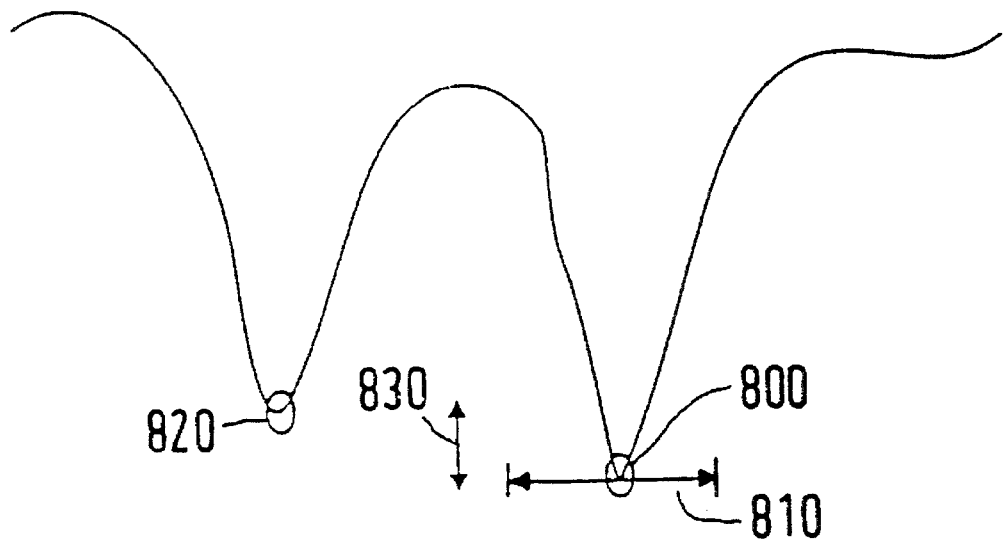
FIG. 8 illustrates a correlation surface having multiple minima which fails a basic confidence test.

If there is more than one minimum present in the correlation surface, the basic confidence test may not yield a valid result. This situation is illustrated in FIG. 8, in which a first minimum 800 is surrounded by an exclusion region 810. The next lowest point outside the exclusion region (i.e. a point 820) is detected as the second minimum. The correlation difference 830 between the first 810 and second 820 minima is less than the preset threshold, and so the motion vector generated from the minimum 800 is deemed not to be valid.

The basic confidence test described above would lead to a large number of potentially usable motion vectors being discarded as invalid. In order that one of the plurality of minima in the correlation surface of FIG. 8 can be detected and used in the generation of a motion vector, a weighting function is applied to the correlation surfaces before the minima are detected. The weighting process is illustrated in FIGS. 9a, 9b, 10a, 10b, 11a, 11b, 12a, 12b, 13a, 13b, 14a and 14b.

Figure 9A:
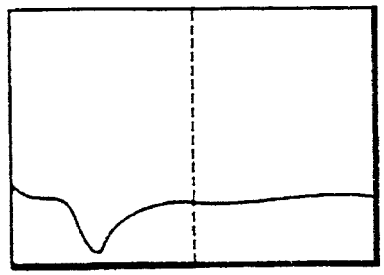
FIG. 9a illustrates a correlation surface having a low average level.
Figure 9B:
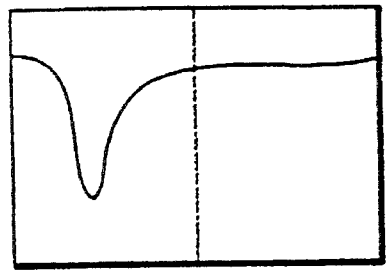
FIG. 9b illustrates a correlation surface having a high average level.
Figure 10A:
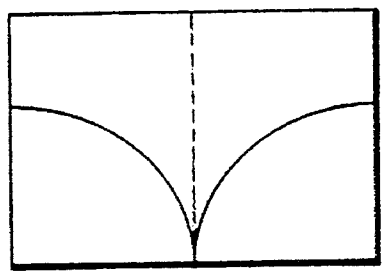
FIGS. 10a and 10b illustrate a conical weighting function.
Figure 10B:
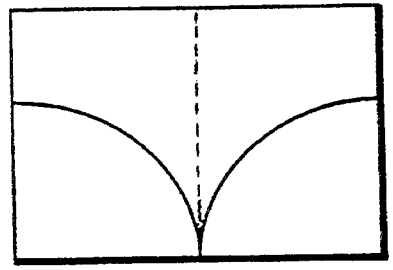

FIG. 9a illustrates a correlation surface CS(x,y) having a low average level, and FIG. 9b illustrates a similar correlation surface CS(x,y) having a high average level. A conical weighting function w(x,y), is illustrated in FIGS. 10a and 10b. The function has the following form:

$$w(x, y) = A \cdot ((x-x_c)^2 + (y-y_c)^2)^{1/n}$$

In the above equation, the index "n" may be, for example, 3. The coordinates $x_c$ and $Y_c$ represent the centre of the correlation surface, i.e. the point indicative of zero image motion.

Figure 11A:
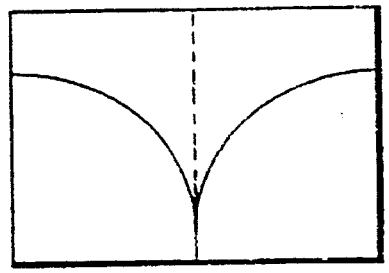
FIGS. 11a and 11b illustrate the sum of a constant value and the conical weighting function of FIGS. 10a and 10b.
Figure 11B:
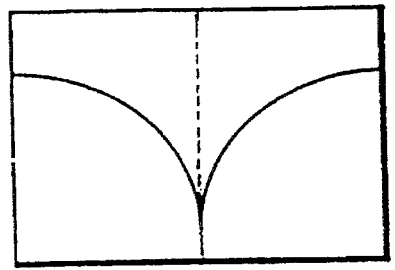
Figure 12A:
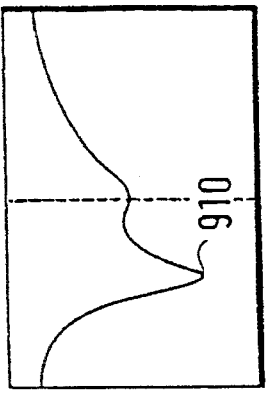
FIG. 12a and 12b illustrate a multiplicative combination of the correlation surfaces of FIGS. 9a and 9b and the composite weighting function of FIGS. 11a and 11b.
Figure 12B:
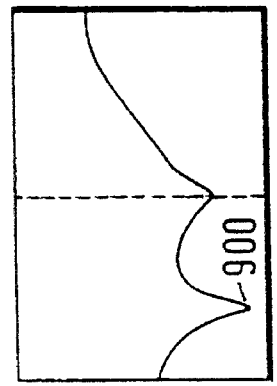

In the present embodiment, a constant B is added to the conical weighting function w(x,y), as illustrated in FIGS. 11a and 11b. The sum of the conical weighting function and the constant B is then combined with (multiplied by) the correlation surfaces, to generate respective weighted correlation surfaces as shown in FIG. 12a and 12b. In each of FIGS. 12a and 12b, a clear minimum value (900, 910) can be detected.

Figure 13A:
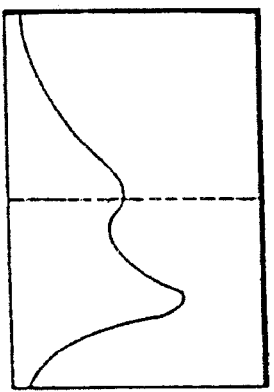
FIG. 13a and 13b illustrate an additive combination of the correlation surfaces of FIGS. 9a and 9b and the conical weighting function of FIGS. 10a and 10b.
Figure 13B:
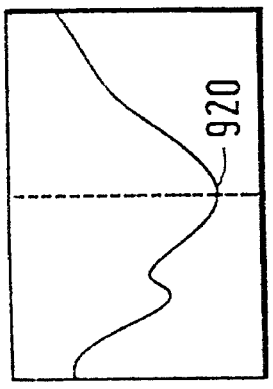

For comparison, FIGS. 13a and 13b show the result if the conical weighting function is added to the correlation surface. For a low average level correlation surface (FIG. 13a) an incorrect minimum is generated.

Figure 14A:
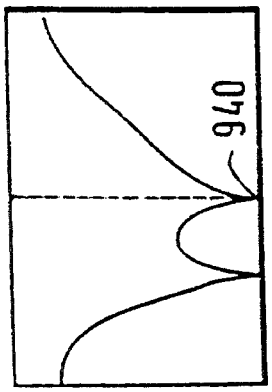
FIG. 14a and 14b illustrate a multiplicative combination of the correlation surfaces of FIGS. 9a and 9b and the conical weighting function of FIGS. 10a and 10b.
Figure 14B:
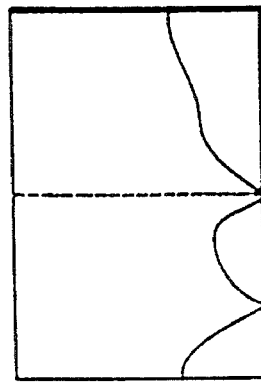

Similarly, for comparison, FIGS. 14a and 14b show the result if the conical weighting function alone (without the constant B) is multiplied by each correlation surface CS(x, y). FIGS. 14a and 14b show that a false minimum 930, 940 would be generated to falsely represent zero motion on each of the two correlation surfaces.

As illustrated in FIGS. 12a, 12b, 13a, 13b, 14a and 14b, the use of a multiplicative weighting function comprising a constant value (B) plus a variable function (the conical function) means that the weighting applied to the correlation surface is scaled according to the average level of the correlation surface. Furthermore, the fact that the weighting function is always non-zero means that false minima are not generated by applying the weighting function.

Figure 15:
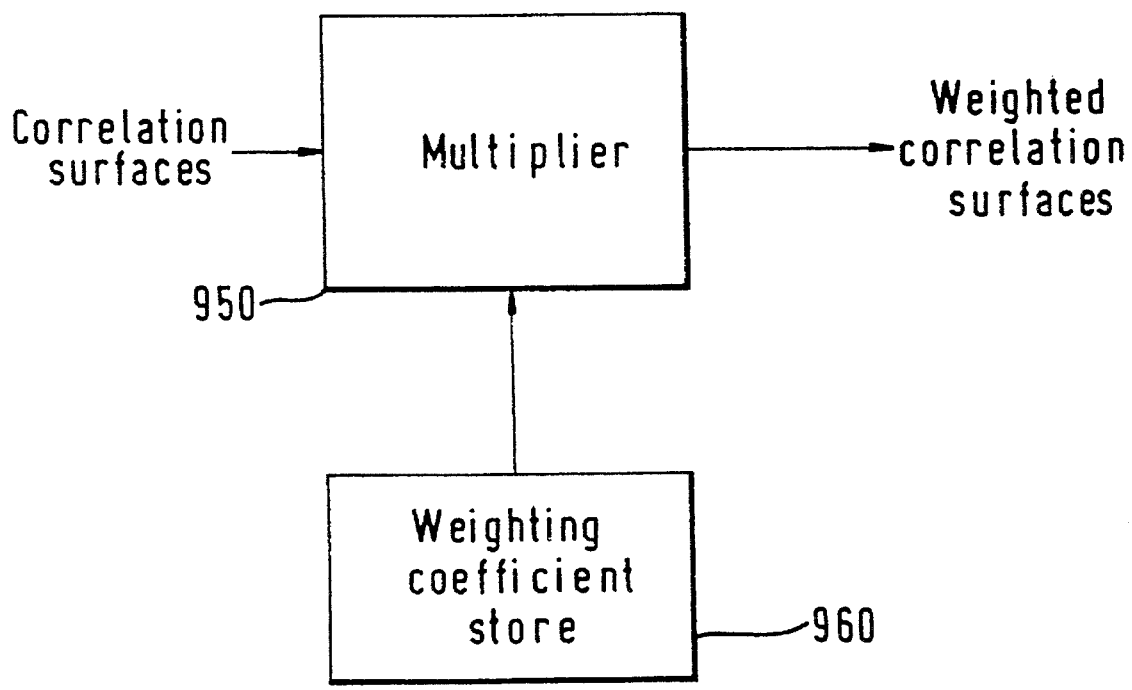
FIG. 15 is a schematic block diagram of an apparatus for weighting correlation surfaces.

FIG. 15 is a schematic block diagram of an apparatus for weighting correlation surfaces. The correlation surfaces are received in serial form as successive data values by a multiplier 950 which multiplies each data value by a weighting value stored in a weighting coefficient store 960 (e.g. a read only memory). Appropriate weighting values are output cyclically by the weighting coefficient store 960 in dependence on the position of each data value within the respective correlation surface.

The apparatus of FIG. 15 may be interposed between the block matched 190 and the vector estimator. Weighting may be applied to either the original or the interpolated correlation surfaces.

In an alternative embodiment, all of the correlation surfaces required for vector estimation are generated by block matching (i.e. the interpolation of correlation surfaces is not performed). In this case, weighting may be applied by the apparatus of FIG. 15 to the directly-generated correlation surfaces before vector estimation is performed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Motion compensated video signal processing apparatus in which motion vectors are generated to represent image motion between a pair of input images of an input video signal, said apparatus comprising:

means for comparing search blocks within one of said pair of input images with respective search areas, comprising a plurality of blocks, in the other of said pair of input images, to generate a first plurality of original correlation surfaces, each comprising an array of correlation values representing correlation between said respective search block and search area;

means for generating a second plurality of interpolated correlation surfaces by interpolation from said plurality of original correlation surfaces; and means for generating a respective motion vector from each interpolated correlation surface, in dependence on a point of maximum correlation in said interpolated correlation surface.

2. Apparatus according to claim 1, in which each original correlation surface comprises an array of correlation values representing a difference between a content of said respective search block and said respective search area.

3. Apparatus according to claim 2, in which said correlation values represent a difference between a luminance content of said search block and said search area.

4. Apparatus according to claim 2, in which said means for generating a motion vector comprises means for detecting a correlation value indicative of minimum difference between said search block and said search area.

5. Apparatus according to claim 1, in which said second plurality is greater than said first plurality.

6. Apparatus according to claim 1, in which:

said first plurality of original correlation surfaces comprises a rectangular array of original correlation surfaces, a position of each original correlation surface within said rectangular array depending on a position of a corresponding search block within said respective input image; and said second plurality of interpolated correlation surfaces comprises a rectangular array of interpolated correlation surfaces.

7. Apparatus according to claim 1, in which each interpolated correlation surface comprises an array of correlation values, said apparatus comprising:

means for multiplying said array of correlation values in each interpolated correlation surface by a weighing value dependent on a position of said correlation value within said array, thereby generating a weighted interpolated correlation surface comprising an array of weighted correlation values; and means for generating a motion vector from said weighted interpolated correlation surface, in dependence on a weighted correlation value indicative of a point of maximum correlation in said weighted correlation surface.

8. Motion compensated video signal processing apparatus in which motion vectors are generated to represent image motion between a pair of input images of an input video signal, said apparatus comprising:

means for comparing a search block within one of said pair of input images with a respective search area, comprising a plurality of blocks, in the other of said pair of input images, to generate a correlation surface comprising an array of correlation values representing correlation between said search block and said search area;

means for multiplying each correlation value by a weighting value dependent on a position of said correlation value within said array, thereby generating a weighted correlation surface comprising an array of weighted correlation values wherein said weighting values increase monotonically with increasing distance from a predetermined point within said array of correlation values and said weighting value at said predetermined point is a nonzero value; and means for generating a motion vector from said weighted correlation surface, in dependence on a weighted correlation value indicative of a point of maximum correlation in said weighted correlation surface.

9. Apparatus according to claim 8, in which said predetermined point is a point indicative of zero image motion.

10. Apparatus according to claim 8, in which said weighting values increase in proportion to a square root of distance from said predetermined point.

11. Apparatus according to claim 8, comprising means for performing a predetermined confidence test on each motion vector to determine whether said detected point of maximum correlation in said weighted correlation surface represents a significant correlation maximum in said weighted correlation surface.

12. Apparatus according to claim 1, comprising a motion compensated interpolator for interpolating an output image of an output video signal according to said motion vectors generated from said pair of input images.

13. Apparatus according to claim 8, comprising a motion compensated interpolator for interpolating an output image of an output video signal according to said motion vectors generated from said pair of input images.

14. A motion compensated television standards converter comprising apparatus according to claim 1.

15. A motion compensated television standards converter comprising apparatus according to claim 8.

16. A method of motion compensated video signal processing in which motion vectors are generated to represent image motion between a pair of input images of an input video signal, said method comprising the steps of:

comparing search blocks within one of said pair of input images with respective search areas, comprising a plurality of blocks, in the other of said pair of input images, to generate a first plurality of original correlation surfaces, each comprising an array of correlation values representing correlation between said respective search block and said respective search area;

generating a second plurality of interpolated correlation surfaces by interpolation from said plurality of original correlation surfaces; and generating a respective motion vector from each interpolated correlation surface, in dependence on a point of maximum correlation in said interpolated correlation surface.

17. A method of motion compensated video signal processing in which motion vectors are generated to represent image motion between a pair of input images of input video signals, said method comprising the steps of:

comparing a search block within one of said pair of input images with a respective search area, comprising a plurality of blocks, in the other of said pair of input images, to generate a correlation surface comprising an array of correlation values representing correlation between said search block and said search area;

multiplying each correlation value by a weighting value dependent on a position of said correlation value within said array, thereby generating a weighted correlation surface comprising an array of weighted correlation values, wherein said weighted values increase monotonically with increasing distance from a predetermined point within said array of correlation values and said weighting value at said predetermined point is a nonzero value; and generating a motion vector from said weighted correlation surface, in dependence on a weighted correlation value indicative of a point of maximum correlation in said weighted correlation surface.

18. Apparatus according to claim 1, comprising means for performing a predetermined confidence test on each motion vector to determine whether said detected point of maximum correlation in said interpolated correlation surface represents a significant maximum in said interpolated correlation surface.

* * * * *